(12) United States Patent
Dodd-Noble et al.

(10) Patent No.: US 11,729,608 B2
(45) Date of Patent: *Aug. 15, 2023

(54) EFFICIENT USER PLANE FUNCTION SELECTION WITH S10 ROAMING

(71) Applicant: Cisco Technology, Inc., San Jose, CA (US)

(72) Inventors: Aeneas Sean Dodd-Noble, Andover, MA (US); Raghavendra Vidyashankar Suryanarayanarao, Bangalore South (IN); Ryo Watanabe, Tokyo (JP); Vivek Agarwal, Chelmsford, MA (US); Rajiv Asati, Morrisville, NC (US); Om Prakash Suthar, Bolingbrook, IL (US); Santanu Dasgupta, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 170 days.

This patent is subject to a terminal disclaimer.

(21) Appl. No.: 17/306,330

(22) Filed: May 3, 2021

(65) Prior Publication Data

US 2021/0258771 A1    Aug. 19, 2021

Related U.S. Application Data

(63) Continuation of application No. 16/367,627, filed on Mar. 28, 2019, now Pat. No. 11,070,974.

(30) Foreign Application Priority Data

Dec. 19, 2018    (IN) .............................. 201841048117

(51) Int. Cl.
*H04W 8/26* (2009.01)
*H04W 76/12* (2018.01)
(Continued)

(52) U.S. Cl.
CPC ........... *H04W 8/26* (2013.01); *H04L 61/4511* (2022.05); *H04W 4/025* (2013.01); *H04W 8/08* (2013.01);
(Continued)

(58) Field of Classification Search
CPC ..... H04L 61/4511; H04W 8/26; H04W 4/025; H04W 8/08; H04W 76/12; H04W 76/10; H04W 84/042; H04W 4/02
(Continued)

(56) References Cited

U.S. PATENT DOCUMENTS 9,554,314 B2    1/2017  Hakola et al.
10,064,120 B2   8/2018  Olsson et al.
(Continued)

FOREIGN PATENT DOCUMENTS

CN    106912012 A   *  6/2017  ............. H04L 67/14
CN    103096289 B   * 12/2017  ............. H04W 4/02
(Continued)

OTHER PUBLICATIONS

3GPP Organizational Partners, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.2.0, Mar. 2019, 418 pages.

(Continued)

*Primary Examiner* — Rownak Islam
(74) *Attorney, Agent, or Firm* — Edell, Shapiro & Finnan, LLC

(57) ABSTRACT

A solution for selecting an optimal user Plane entity (with Control and User Plane Separation (CUPS)) per UE during seamless roaming. In one embodiment, a method is provide that is performed by a control plane entity in a mobile core network that supports inter public land mobile network (Continued)

(PLMN) roaming among two or more PLMNs. The method includes obtaining a create session request from an entity in a second PLMN to which a user equipment has roamed from a first PLMN; selecting a particular user plane entity among a plurality of user plane entities based on one or more user equipment related parameters; and establishing a session with the particular user plane entity to serve user plane traffic in the mobile core network for the user equipment.

20 Claims, 13 Drawing Sheets

(51) Int. Cl.
    *H04W 4/02*    (2018.01)
    *H04W 8/08*    (2009.01)
    *H04L 61/4511*    (2022.01)
    *H04W 84/04*    (2009.01)
    *H04W 76/10*    (2018.01)

(52) U.S. Cl.
    CPC ............ *H04W 76/12* (2018.02); *H04W 76/10* (2018.02); *H04W 84/042* (2013.01)

(58) Field of Classification Search
    USPC ........................................................ 370/329
    See application file for complete search history.

(56) References Cited

U.S. PATENT DOCUMENTS

| | | |
|---|---|---|
| 2007/0232301 A1 | 10/2007 | Kueh et al. |
| 2011/0237250 A1 | 9/2011 | Horn et al. |
| 2011/0305138 A1 | 12/2011 | Huomo et al. |
| 2012/0155324 A1 | 6/2012 | Janakiraman et al. |
| 2013/0272256 A1 | 10/2013 | Mihaly |
| 2016/0119830 A1 | 4/2016 | Iwai |
| 2017/0150420 A1 | 5/2017 | Olsson et al. |
| 2019/0191343 A1 | 6/2019 | Iwai et al. |
| 2019/0261213 A1 | 8/2019 | Palnati et al. |
| 2020/0196155 A1 | 6/2020 | Bogineni et al. |

FOREIGN PATENT DOCUMENTS

| | | | | |
|---|---|---|---|---|
| WO | WO-2018095506 A1 | * | 5/2018 | |
| WO | WO-2019037779 A1 | * | 2/2019 | ............ H04W 4/06 |

OTHER PUBLICATIONS

3GPP Organizational Partners, "3rd Generation Partnership Project; Technical Specification Group Services and System Aspects; System Architecture for the 5G System; Stage 2 (Release 15)", 3GPP TS 23.501 V15.5.0, Mar. 2019, 241 pages.

The GSM Association, "LTE and EPC Roaming Guidelines", Version 10.0, Jul. 10, 2013, 68 pages.

Cisco Systems, Inc., "Mobility Management Entity Overview", MME Administration Guide, StarOS Release 20, https://www.cisco.com/c/en/us/td/docs/wireless/asr_5000/20/MME/b_20_MME_Admin.html, Mar. 31, 2016, 68 pages.

3GPP Organizational Partners, "3rd Generation Partnership Project; Technical Specification Group Core Network and Terminals; Domain Name System Procedures; Stage 3 (Release 9)", 3GPP TS 29.303 V9.1.0, Mar. 2010, 51 pages.

* cited by examiner

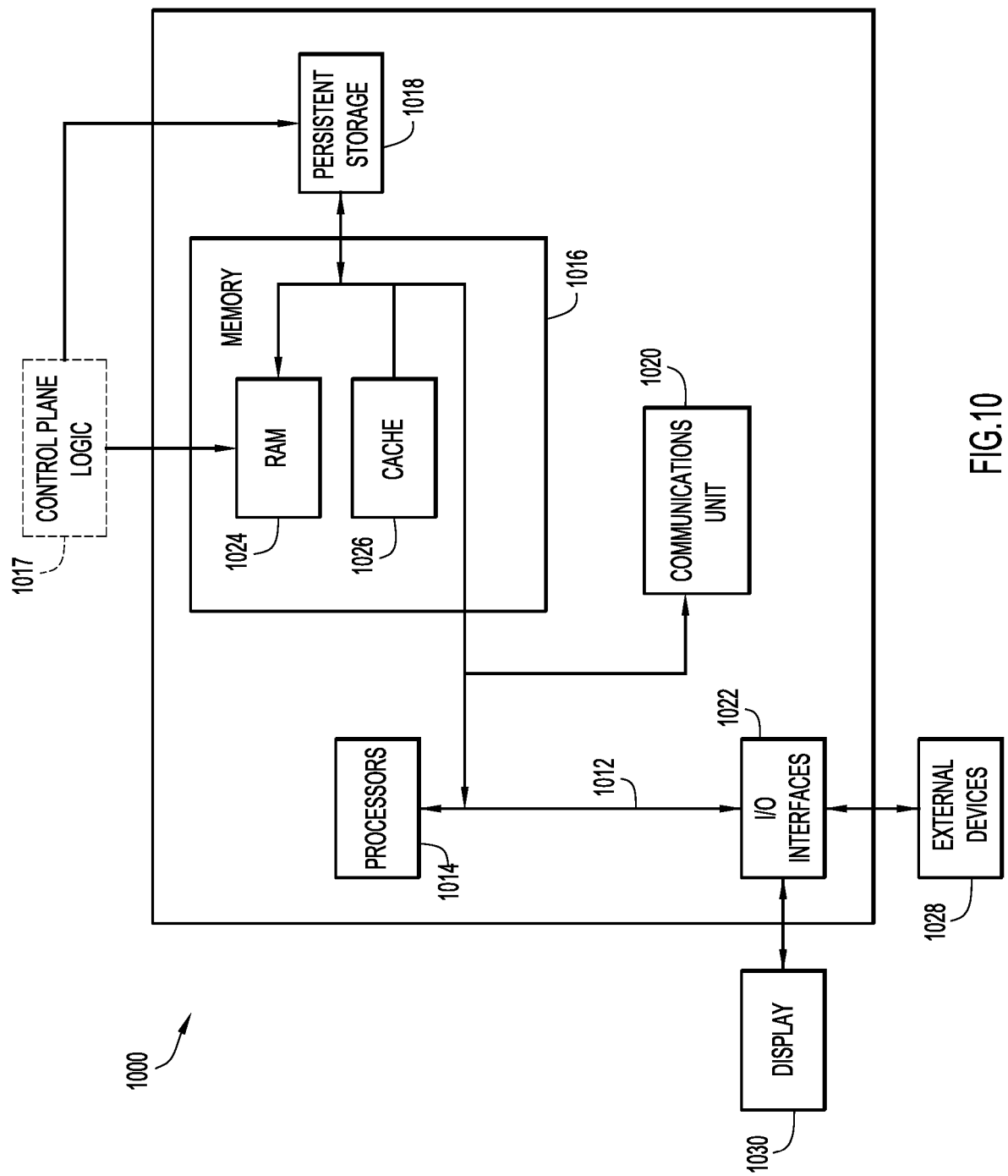

EFFICIENT USER PLANE FUNCTION SELECTION WITH S10 ROAMING

CROSS-REFERENCE TO RELATED APPLICATIONS

This application is a continuation application of U.S. patent application Ser. No. 16/367,627 filed on Mar. 28, 2019, entitled, "Efficient User Plan Function Selection with S10 Roaming," which claims the benefit of priority to Indian Provisional Patent Application No. 201841048117, filed Dec. 19, 2018, entitled, "Efficient User Plane Function Selection with S10 Roaming," the entireties of which are incorporated herein by reference.

TECHNICAL FIELD

The present disclosure relates to a mobile core infrastructure network.

BACKGROUND

Inter Public Land Mobile Network (PLMN) roaming may be performed using a control interface between Mobility Management Entities (MMEs). This interface is called the S10 Interface, as defined for the Long Term Evolution/Fourth Generation (4G) wireless communication technology standard. One function associated with inter-PLMN roaming involves determining the best location for user plane functions when the mobile user equipment (UE) is frequently hopping across different roaming operator networks. User Plane Function (UPF) selection may be achieved using base evolved NodeB (eNodeB or eNB) Tracking Area Identity (TAI), Access Point Name (APN) and various Mobile Edge Computing (MEC) policies. This is not a problem when the UE is on its home network but can be a challenge when roaming, because the Packet Data Network Gateway User Plane (PGW-U) needs to be topologically close to the peering point, which may conflict with the home PLMN (h-PLMN) node selection rules.

A Domain Name System (DNS) server returns all the PGW identifiers (ID's) available for the APN, which could include the PGW in the data center that is remote from the user, a typical scenario in a home-routed roaming environment. The DNS server could use the source IP address of the MME to only return the PGW's that are in the same location as the MME. The MME selects the PGW Control Plane (PGW(C)) based on the visiting PLMN (v-PLMN) policy and the S8-C Packet Data Network (PDN) establishment request is set to the PGW(C).

BRIEF DESCRIPTION OF THE DRAWINGS

FIG. 10 is a diagram of a computing device/apparatus that may be configured to perform the control plane entity functions described herein, according to an example embodiment.

DESCRIPTION OF EXAMPLE EMBODIMENTS

Overview

Presented herein is a solution for selecting an optimal user Plane entity (with Control and User Plane Separation (CUPS)) per UE during seamless roaming. In one embodiment, a method is provided that is performed by a control plane entity in a mobile core network that supports inter public land mobile network (PLMN) roaming among two or more PLMNs. The method includes obtaining a create session request from an entity in a second PLMN to which a user equipment has roamed from a first PLMN; selecting a particular user plane entity among a plurality of user plane entities based on one or more user equipment related parameters; and establishing a session with the particular user plane entity to serve user plane traffic in the mobile core network for the user equipment.

EXAMPLE EMBODIMENTS

Figure 1:
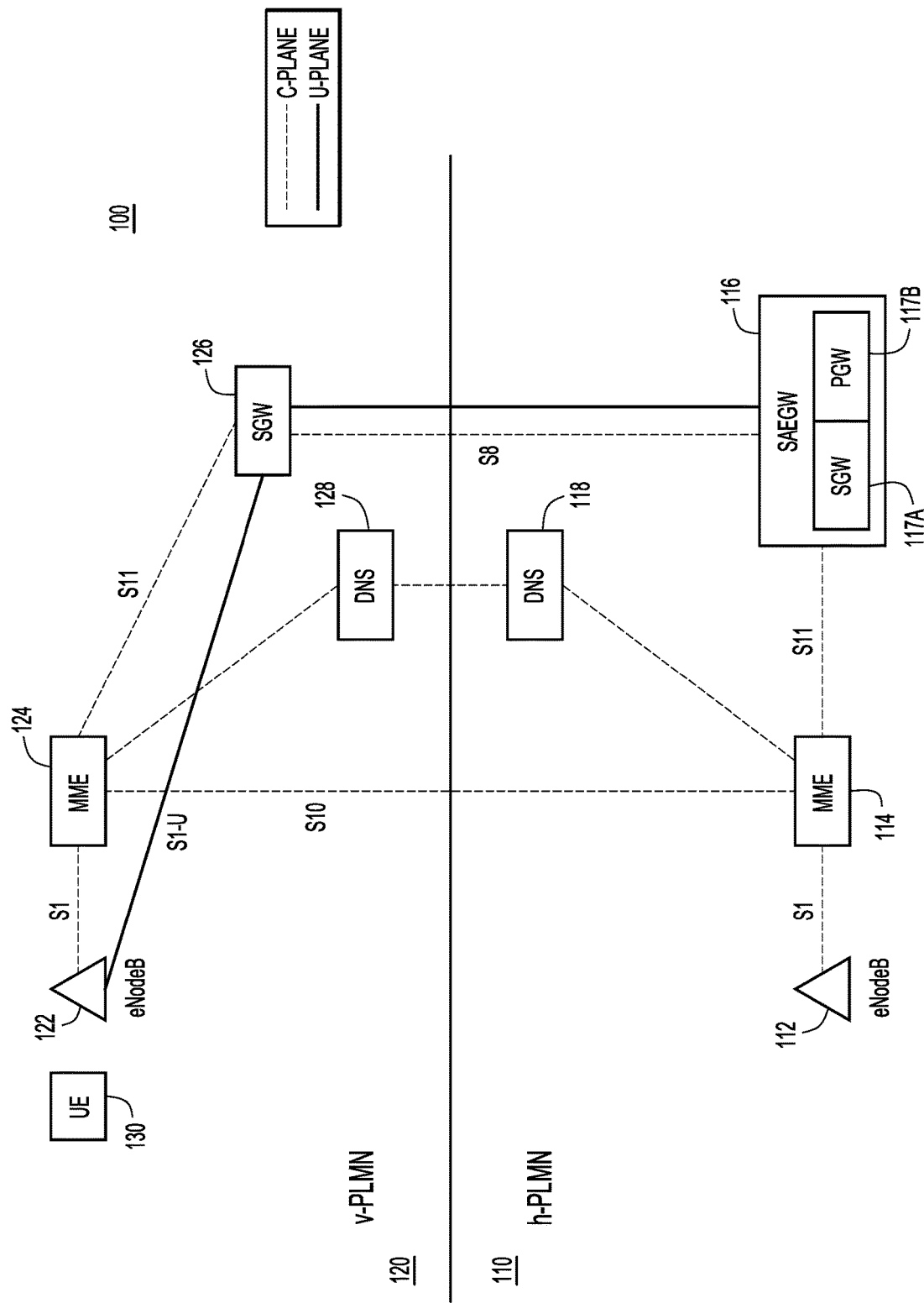
FIG. 1 is a diagram showing a mobile user device roaming scenario without control and user plane separation, according to an example embodiment.

Reference is first made to FIG. 1, which shows inter-PLMN roaming using the "S10" interface. The S10 interface is a LTE/4G control interface between the Mobility Management Entities (MMEs) and base stations. Inter-PLMN roaming using S10 presents a challenge in terms of determining the best location for User Plane Function (UPF) entity, such as the PGW-U.

FIG. 1 shows a simplified mobile core network architecture 100 that includes a home PLMN (h-PLMN) 110 and a visiting PLMN (v-PLMN) 120. The mobile core network architecture 100 does not have control and user plane separation (CUPS). The h-PLMN 110 includes an eNodeB 112, an MME 114, a System Architecture Evolution Gateway (SAEGW) 116 that includes a Serving Gateway (SGW) 117A and a PGW 117B and a Doman Name System (DNS) server 118. Similarly, the v-PLMN 120 includes an eNodeB 122, an MME 124, an SGW 126 and a DNS server 128. A UE 130 is also shown in FIG. 1, in the v-PLMN 120.

During Packet Data Network (PDN) establishment as part of fresh registration in the v-PLMN, the MME 124 in v-PLMN 120 queries the DNS server 128 for the available PGW's. At this point the PGW 117B of the h-PLMN 110 can determine which optimum PGW to select to satisfy the S10 roaming and v-PLMN topology. The location of the UE 130 is provided in the PDN establishment request and the associated h-PLMN location is taken into account in the PGW selection so that the SGW 117A collocated with the PGW 117B is selected when the UE roams back to the h-PLMN.

Figure 2:
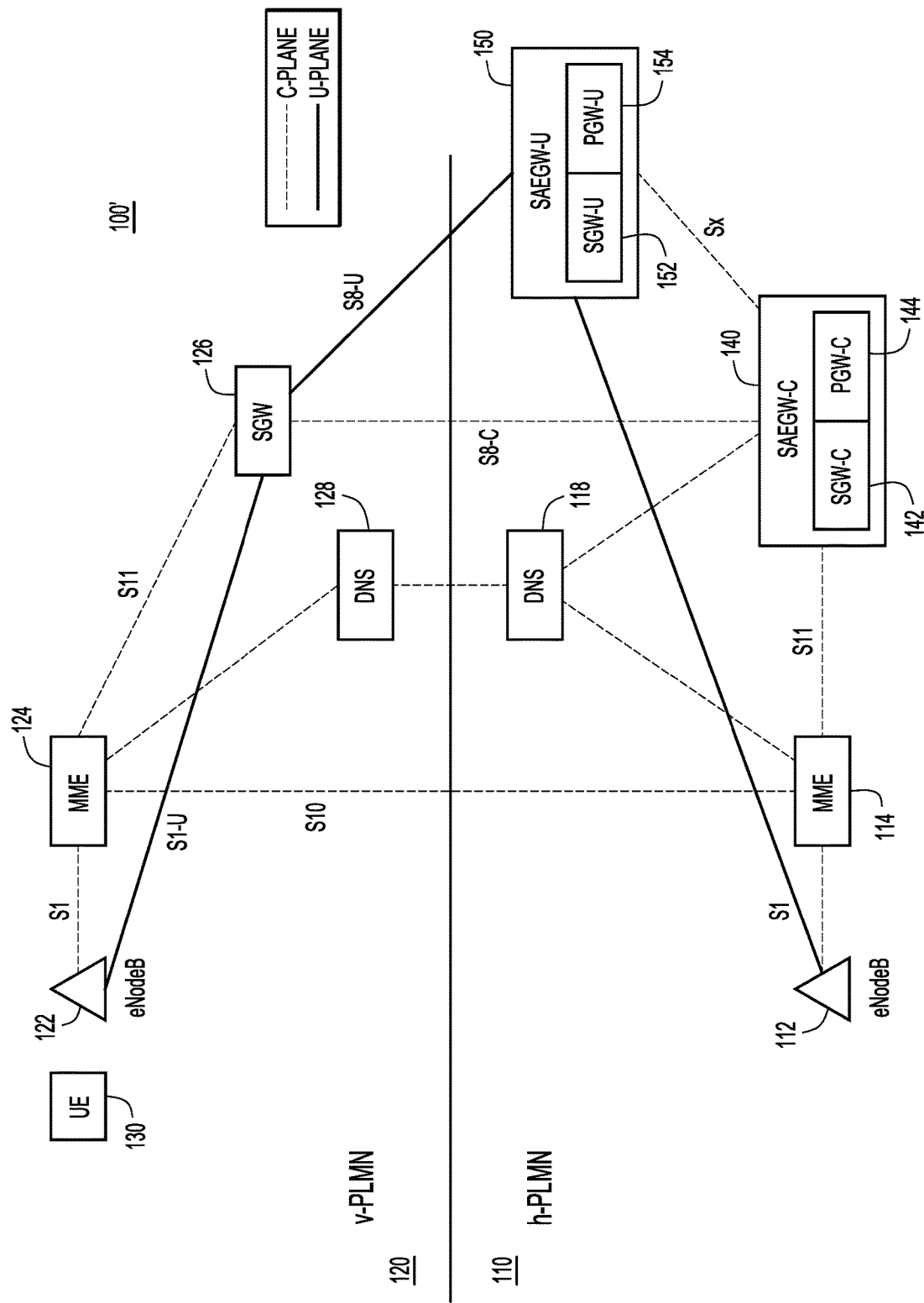
FIG. 2 is a diagram showing a mobile user device roaming scenario with control and user plane separation, according to an example embodiment.

FIG. 2 shows a similar scenario to that depicted in FIG. 1, but with a CUPS mobile core network architecture, shown at 100'. Of note, the SAEGW 116 in FIG. 1 is split out into an SAEGW control plane entity (SAEGW-C) 140 that includes SGW-C 142 and PGW-C 144 and a SAEGW user plane entity (SAEGW-U) 150 that includes SGW-U 152 and PGW-U 154.

Optimum UPF selection is not a problem when the UE 130 is in the h-PLMN but can be a challenge when the UE 130 is roaming because the PGW-U 154 needs to be topologically close to the peering point and thus may conflict with the h-PLMN node selection rules.

Figure 3:
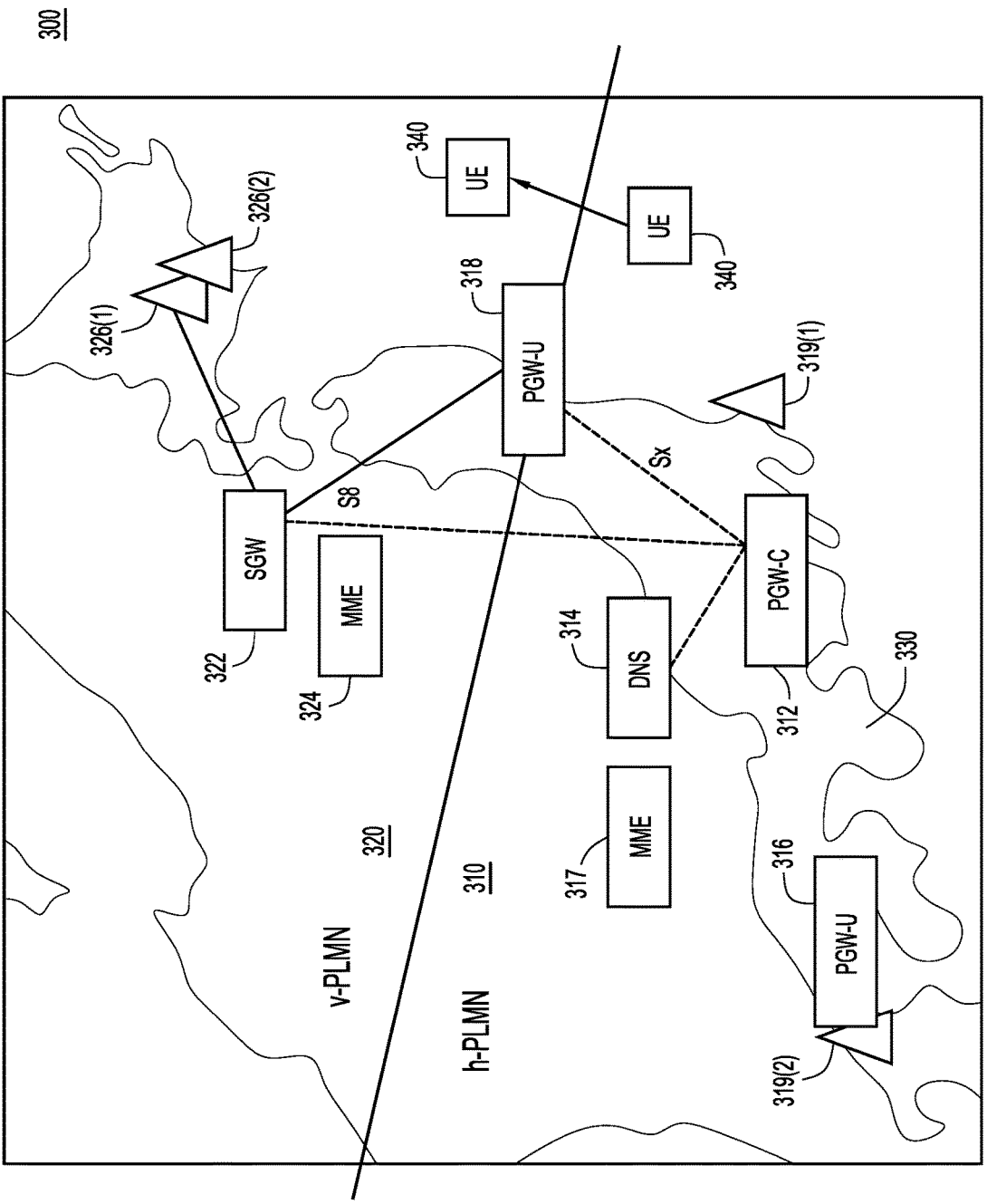
FIG. 3 is a diagram showing a scenario in which a mobile user device moves to a visiting network and attempts to do a fresh registration, according to an example embodiment.

Scenario 1—Subscriber Moves to the Visiting Network and Tries to do a Fresh Registration with S8 Home-Routed Policy/Agreement Between Roaming Operators Reference is now made to FIG. 3. FIG. 3 shows a mobile core network architecture 300 that includes an h-PLMN 310 and a v-PLMN 320. The h-PLMN 310 includes PGW-C 312, DNS server 314, PGW-U 316 and PGW-U 318, h-MME 317 and eNodeB's 319(1) and 319(2). The v-PLMN 320 includes v-SGW 322, v-MME 324, and eNodeB's 326(1) and 326(2). FIG. 3 also shows the architecture 300 overlaid a geographical area 330 representative of the country of Japan, as an example. The components of the h-PLMN 310 are shown at various locations in a southern portion of the country, and the components of the v-PLMN 320 are shown at locations in the northern portion of the country. The PGW-U 318 is shown at a boundary of the h-PLMN 310 and the v-PLMN 320.

In the scenario of FIG. 3, a UE 340 roams into the v-PLMN 320 and tries to do a fresh registration with a new PDN connection establishment using the S8 home-routed/policy agreement approach. The MME 324 in the v-PLMN 320 will resolve and select the address of the PGW-C 312 of the h-PLMN 310. The PGW-C 312 in the h-PLMN 310 should now be able to select an optimal PGW-U which is topologically closer to the SGW 322 of the v-PLMN. This involves use of a view or analysis of the v-PLMN topology and S8 IP topology by the PGW-C 312. More specifically, the PGW-C 312 can use all of this information in combination to select the best PGW-U node, thereby ensuring a better roaming service experience for mobile users. In the scenario depicted in FIG. 3, the PGW-C 312 can select the best location PGW-U, e.g., PGW-U 312 which is at the edge of the v-PLMN 320, for user plane traffic by a DNS query to DNS server 314, based on E-UTRAN Cell Global Identifier (ECGI), Tracking Area Code (TAC), APN, MEC, SGW's IP topology and security policies, for example.

FIG. 3 is indicative of a scenario when the boundary between the h-PLMN 310 and v-PLMN 320 are very near to each other or overlapping. In this case, there is a need to look into the entire topology to find the best user plane function entity (e.g., PGW-U) to serve a call. When a user frequently hops between PLMNs, the user plane is fixed and anchored/not changing. This provides for a better user experience.

Figure 4A:
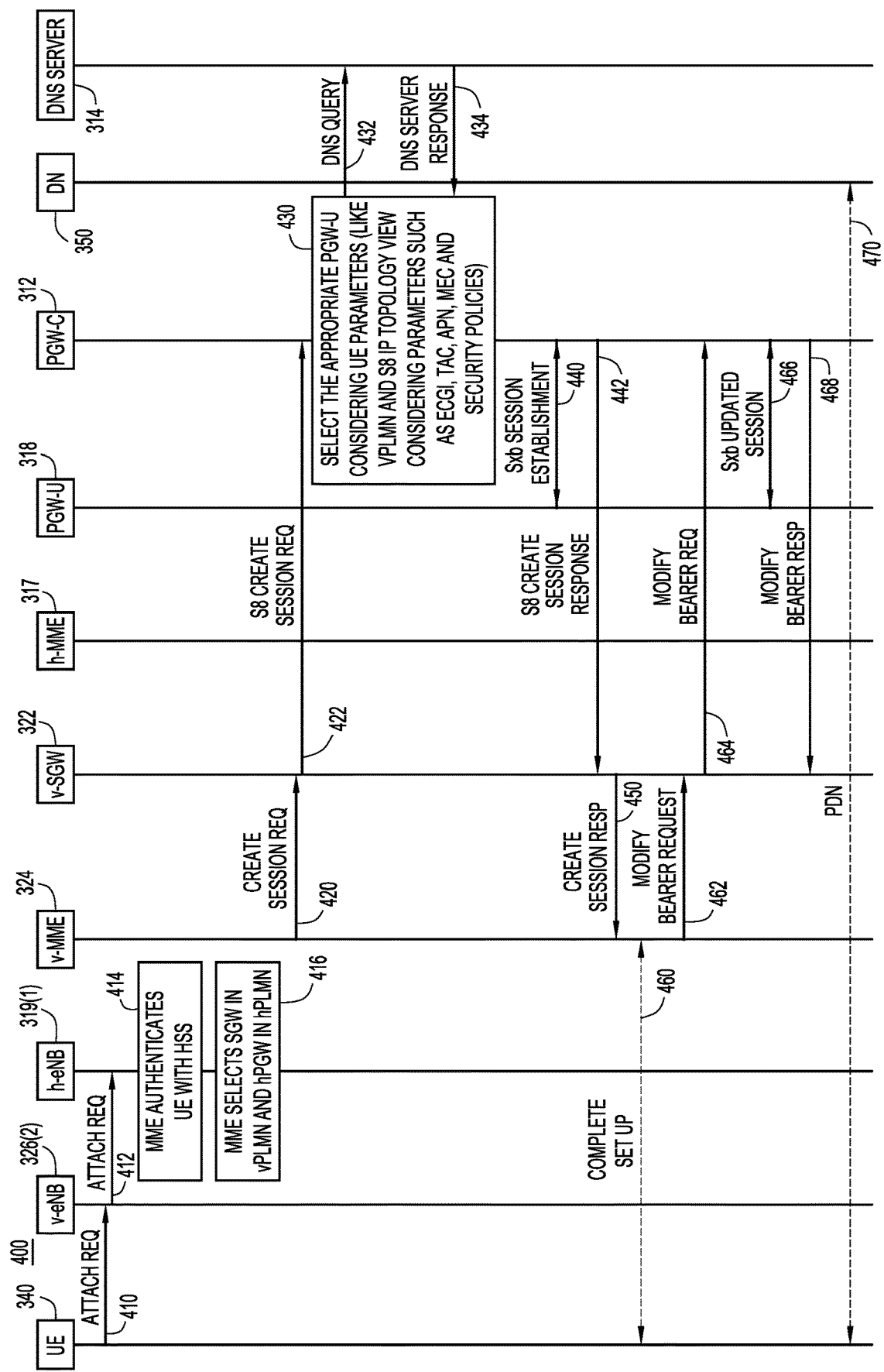
FIG. 4A is a sequence diagram for a process by which a user plane entity is selected for the scenario depicted in FIG. 3, according to an example embodiment.

Reference is now made to FIG. 4A which illustrates a call flow process 400 for the scenario shown in FIG. 3, in which the UE 340 is connected to the h-eNB 319(1) and roams into the v-PLMN 320. In the v-PLMN 320, the UE 340 attempts to do a fresh registration for a new PDN connection establishment with a destination node (DN) 350 using the S8 home-routed/policy agreement approach. Reference is also made to FIG. 3 for purposes of the description of FIG. 4A.

At 410, the UE 340 sends an attachment request (Attach Req) to an eNB in the v-PLMN 320, such as v-eNB 326(2). The v-eNB 326(2) forwards the Attach Req to the v-MME 324 in the v-PLMN 320, as shown at 412. At 414, the v-MME 324 authenticates the UE 340 with the Home Subscribe Server (HSS). Next, at 416, the v-MME 324 selects an SGW in the v-PLMN and an h-PGW in the h-PLMN. For example, the v-MME 324 selects v-SGW 322 and PGW-C 312 in the h-PLMN.

At 420, the v-MME sends a create session request to the v-SGW 322, and at 422 the v-SGW sends an S8 create session request to the PGW-C 312.

At 430, the PGW-C 312 selects the appropriate PGW-U considering one or more UE parameters such as v-PLMN, as well as S8 IP topology view considering parameters such as ECGI, TAC, APN, MEC policies and security policies. The selection 430 may include sending a DNS query 432 to the DNS server 314, receiving a DNS response at 434 from the DNS server 314, and then applying selection criteria to the DNS response 434 (which contains a list of PGW's) to select a particular PGW. For example, the result of the selection operation 430 may be PGW-U 318. The PGW-U selection operation 430 is described in more detail below in connection with FIG. 4B.

At 440, the PGW-C 312 and the PGW-U 318 engage in an Sxb session establishment exchange. At 442, the PGW-C sends to the v-SGW 322 an S8 create session response, which is responsive to the S8 create session request sent at 422. At 450, the v-SGW 322 forwards the create session response to the v-MME 324 (in response to the create session request sent at 420).

At 460, set up of the session is completed between the v-MME 324 and the UE 340 via the v-eNB 326(2).

The v-MME 324 then sends a modify bearer request at 462 to the v-SGW 322. At 464, the v-SGW 322 forwards the modify bearer request to the PGW-C 312. The PGW-C 312 engages in an Sxb updated session exchange with the PGW-U 318 at 466. At 468, the PGW-C 312 sends a modify bearer response to the v-SGW 322. Thereafter, a PDN connection 470 is established between the UE 340 and the DN 350 via the v-eNB 326(2).

Figure 4B:
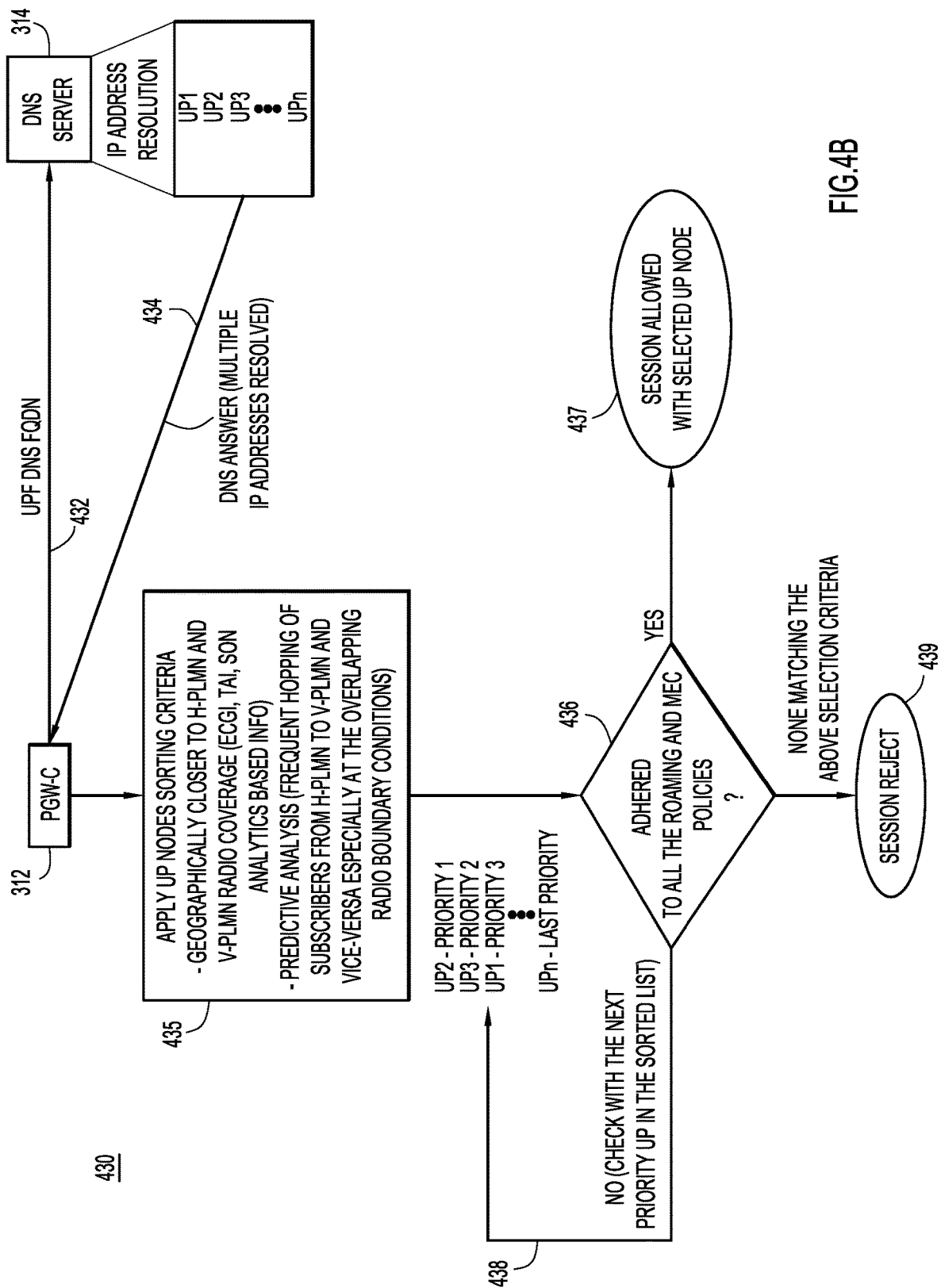
FIG. 4B illustrates an operational flow by which a control plane entity selects an optimal user plane entity, according to an example embodiment.

Reference is now made to FIG. 4B for a more detailed description of the user plane node selection operation 430 of FIG. 4A that involves the PGW-C 312 and the DNS server 314, for example. At 432, the PGW-C 312 sends a DNS query that consists of a user plane function (UPF) Fully Qualified Domain Name (FQDN) DNS query to the DNS server 314. The DNS server 314 performs an IP address resolution operation on the UPF FQDN DNS query and returns a list of IP addresses for a plurality of candidate UP nodes/entities that satisfy the query. These candidate UP nodes/entities are identified as UP1, . . . , UPn in FIG. 4B, and their IP addresses are provided in the DNS response/answer to the PGW-C 312. In the event that the PGW-C 312 loses communication with the DNS server 314, as a failover option the PGW-C may perform a local resolution to identify the IP addresses of candidate UP nodes.

At 435, the PGW-C applies a sorting criteria to the candidate UP nodes. For example, candidate UP nodes are sorted by geographical proximity to the h-PLMN and v-PLMN coverage areas (based on ECGI, TAI, and/or self-optimizing network (SON) analytics information). In addition or in the alternative, the PGW-C applies predictive analysis, based on frequent hopping of subscribers from the h-PLMN to the v-PLMN and vice versa, particularly for overlapping radio boundary conditions. The result of the sorting process 435 is an ordering of the UP nodes by priority, as shown in FIG. 4B.

At 436, the PGW-C determines whether the top priority (after sorting) candidate UP node adheres to all of the roaming and MEC policies. If the result of the decision at 436 is Yes, then at 437, the PGW-C selects and continues the session with that selected candidate UP node. On the other hand, if that candidate UP node does not adhere to all the roaming and MEC policies, then at 438, the PGW-C checks the next priority UP node in the sorted list and the test of operation 436 is repeated for the next UP node in the sorted list until a UP node is found that passes the text of operation 436, or the sorted list is exhausted and it is found that none of the UP nodes in the sorted list passes the test of 436. In that case, the PGW-C rejects the session, as indicated at 439.

Figure 5:
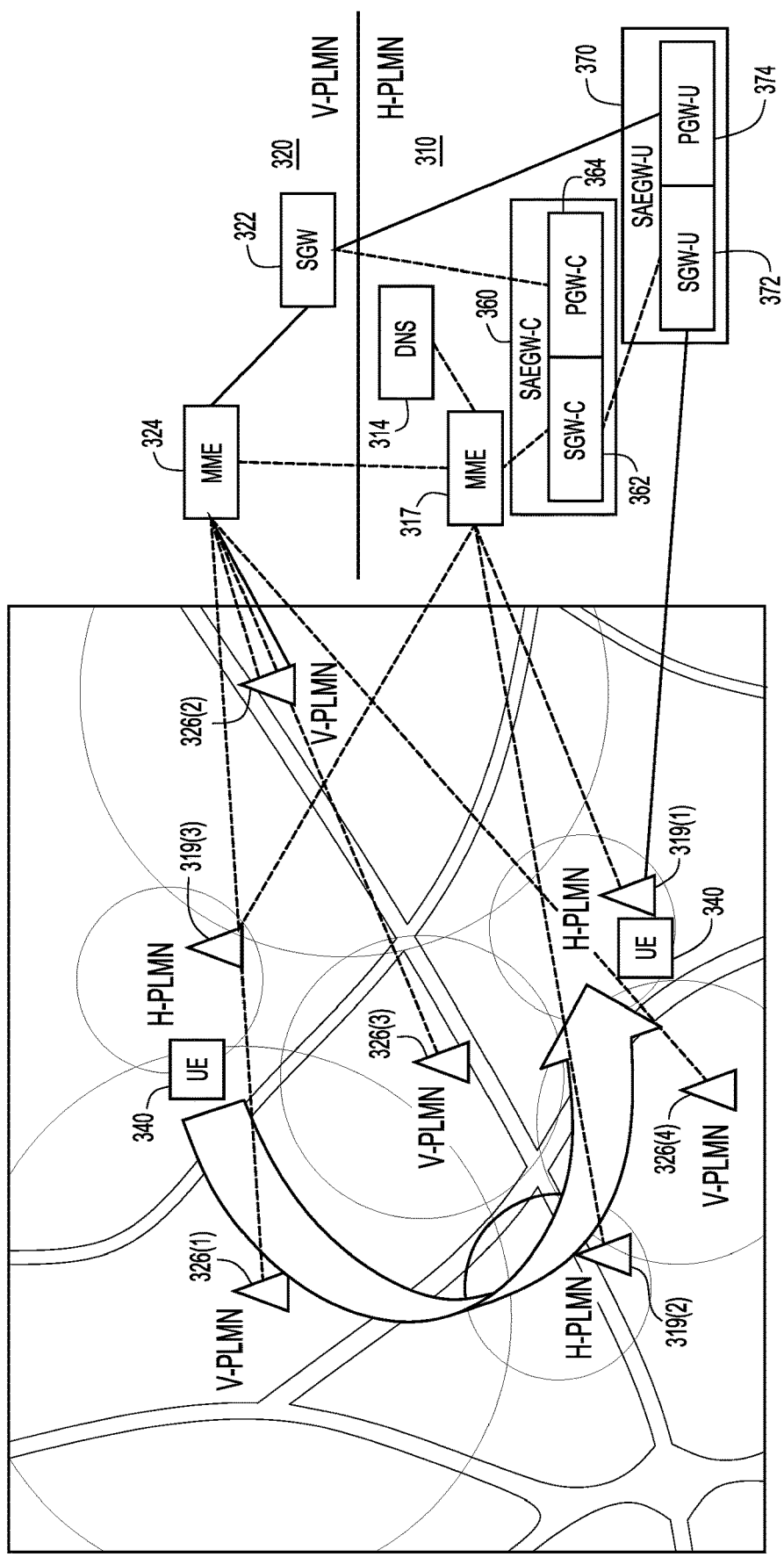
FIG. 5 is a diagram showing a scenario in which a mobile user device is registered in a home network and roams to a visiting network with home-routed interconnectivity, according to an example embodiment.

Scenario 2—Subscriber is First Registered in H-PLMN and Roams into V-PLMN with S10 and S8 (Home-Routed) Interconnectivity to Ensure Seamless Roaming Experience Reference is now made to FIG. 5. In the same topology as that shown in FIG. 3, if the subscriber is first registered to the h-PLMN and if it is in the vicinity/range of the v-PLMN's radio coverage, then there is a good chance that the UE may frequently switchover between neighboring operating company (OpCo) PLMNs seamlessly using the S10 and S8 interfaces.

In FIG. 5, the h-PLMN 310 includes the DNS server 314, MME 317, SAEGW-C 360 that includes SGW-C 362 and PGW-C 364 and a SAEGW-U 370 that includes SGW-U 372 and PGW-U 374. The h-PLMN 310 also includes eNBs 319(1), 319(2) and 319(3). The v-PLMN 320 includes SGW 322, MME 324 and eNBs 326(1)-326(4).

In the scenario of FIG. 5, the PGW-C 364 is assisted with predictive and geographical topology analysis on the UE switchover behavior to be able to select a PGW-U that is optimal for both the h-PLMN 310 and v-PLMN 320. PGW-C 364 also can select the best location central data center (DC) S/PGW for frequently handed off user plane traffic by DNS query based on ECGI, TAC, SGW's IP topology, etc.

Again, in the scenario of FIG. 5, the UE/subscriber is continuously moving and hopping between PLMNs. The DNS server 314 will know that some of these locations are sensitive to handover, and a lookup is done to select the most optimum UP.

Figure 6A:
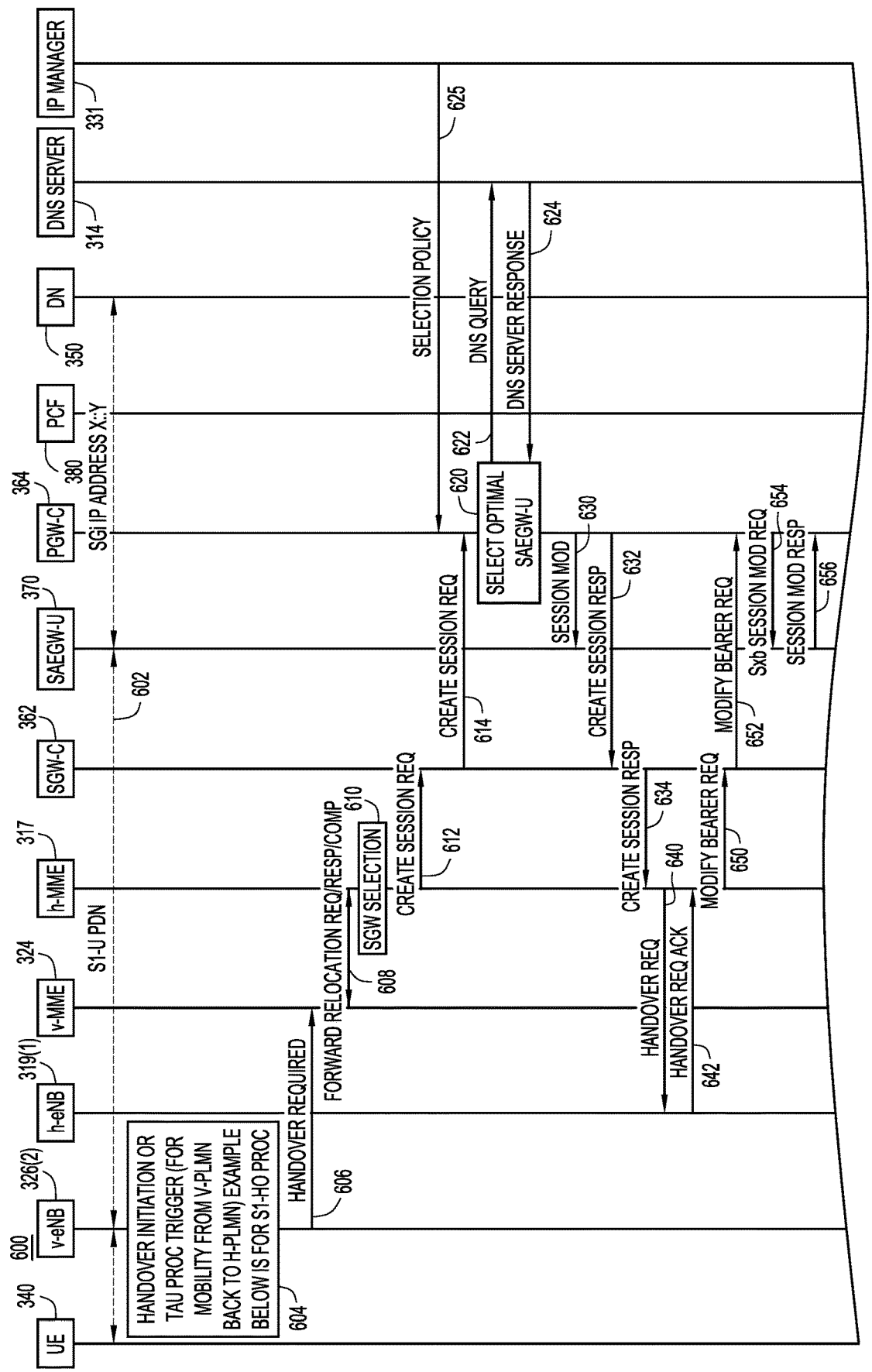
FIGS. 6A and 6B illustrate a sequence diagram for a process by which a user plane entity is selected for the scenario depicted in FIG. 5, according to an example embodiment.
Figure 6B:
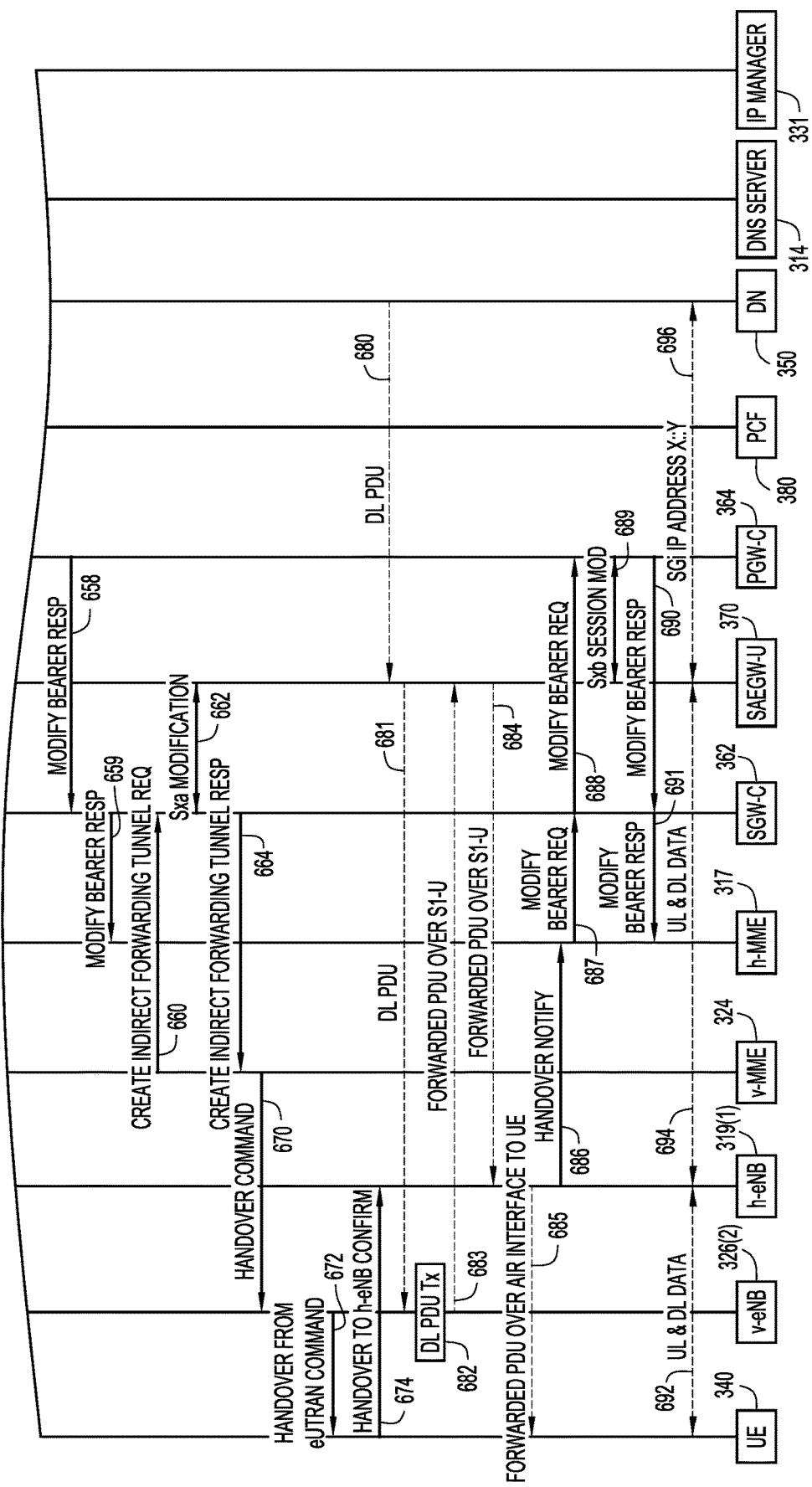

Reference now made to FIGS. 6A and 6B, with continued reference to FIG. 5. FIGS. 6A and 6B show a sequence diagram for a process 600 to select a PGW-U that is well suited for the scenario of FIG. 5. As shown at 601, the UE is in wireless communication with the v-eNB 326(2), and at 602 an S1-U PDN session is maintained between the v-eNB 326(2) and the SAEGW-U 370. The SAEGW-U 370 also is in communication with the DN 350 via an SG1 interface with IP address "X. Y" as shown at 603. At some point in time, due to movement of the UE 340 in the manner described above, handover is initiation or a Tracking Area Update (TAU) procedure is triggered, as shown at 604. The example shown in FIGS. 6A and 6B is for an S1-HO procedure. At 606, the v-eNB 326(2) sends a handover required/request notification to the v-MME 324.

The v-MME 324 and h-MME 317 engage in a relocation request/response exchange at 608. At 610, the h-MME selects an SGW, e.g., SGW-C 362, in the h-PLMN 310. Next, the h-MME 317 sends a create session request to the SGW-C 362, at 612. The SGW-C 362 sends the create session request to the PGW-C 364. At 620, the PGW-C makes a selection of the optimal SAEGW-U. To do this, the PGW-C sends a DNS query at 622 to the DNS server 314 and the DNS server sends a response at 624 with a list of one or more candidate SAEGW-U's. The PGW-C may select the SAEGW-U based on some policy, and that policy could come from an IP manager 331 as shown at 625, to which the PGW-C 364 has connectivity, a local policy configured on the PGW-C 364, or some other entity. The PGW-C 364 could select the same optimal SAEGW-U that was previously selected on the v-PLMN based call to ensure mobile PDN IP retention. The process depicted in FIG. 4B may be followed by the PGW-C 364 in selecting the optimal UP node. As an example, the PGW-C 364 selects the SAEGW-U 370.

At 630, the PGW-C 364 sends a session modification request to the SAEGW-U 370. The PGW-C also sends to the SGW-C 362 a create session response (responsive to the create session request 614) at 632. The SGW-C 362 forwards the create session response to the h-MME 317, at 634.

The h-MME 317 sends a handover request to the h-eNB 319(1) at 640, and at 642 the h-eNB 319(1) sends a handover request acknowledgment (ACK). The h-MME 317 then sends a modify bearer request at 650 to the SGW-C 362. The SWG-C 362 forwards the modify bearer request to the PGW-C 364 at 652, which causes the PGW-C 364 to send an Sxb session modification request to the SAEGW-U 370 at 654, and at 656 the SAEGW-U 370 responds to the PGW-C 364 with an Sxb session modification response. At 658, the PGW-C 364 then sends a modify bearer response (responsive to the modify bearer request in received at 652) to the SGW-C 362. The SGW-C 362 forwards the modify bearer response to the h-MME at 659.

At 660, the v-MME 324 sends a request to create an indirect forwarding tunnel to the SWG-C. At 662, the SGW-C 362 engages in an Sxa modification with the SAEGW-U 370. At 664, the SGW-C 362 sends a create indirect forwarding tunnel response to the v-MME 324.

The v-MME 324 then sends a handover command to the v-eNB 326(2) at 670 in the v-PLMN 310. The v-eNB 326(2) sends a handover from eUTRAN command to the UE 340 at 672. At 674, the UE sends a handover confirmation to the h-eNB 319(1). At this point, handover to h-eNB 319(1) in the h-PLMN 310 is completed.

FIG. 6B shows at 680 a downlink (DL) packet data unit (PDU) being sent from the DN 350 intended for the UE 340. The SAEGW-U 370 receives the DL PDU and forwards it to the v-eNB 326(2) at 681. At 682 the v-eNB 326(2) notes that it has a DL PDU to transmit to the UE 340, but at 683, the v-eNB 326(2) forwards the PDU over the S1-U interface to the SAEGW-U 370. At 684, the SAEGW-U 370 forwards the PDU over the S1-U interface to the h-eNB 319(1), and at 685, the h-eNB 319(1) forwards the PDU via the over the air interface to the UE 340. At 686, the h-eNB 319(1) sends a handover notification to the h-MME 317 in order to complete the handover to h-eNB 319(1). The h-MME 317, at 687, sends a modify bearer request to the SGW-C 362, which in turn forwards the modify bearer request to the PGW-C 364, at 688. At 689, the PGW-C 364 and the SAEGW-U 370 engage in an Sxb session modification. At 690, the PGW-C 364 sends a modify bearer response to the SGW-C 362 which in turn forwards it to the h-MME 317 at 691.

At 692, uplink (UL) and DL data is exchanged wirelessly between the UE 340 and the h-eNB 319(1). The h-eNB 319(1) exchanges the UL and DL data with the SAEGW-U 370 as shown at 694. The SAEGW-U 370 again communicates with the DN 350 on behalf of the UE 340 over the SG1 interface on IP address "X . . . Y" as shown at 696.

Scenario 3—Subscriber First Registered in h-PLMN Served by One of the TAIs, Seamlessly Roams to the v-PLMN and Later Comes Back to the h-PLMN Gets Connected Through a Different TAI in h-PLMN Served by a Different SGW For purposes of describing this scenario, a network environment similar to the one shown in FIG. 2 is used, by way of example. The h-PLMN 310 includes DNS server 314, MME 317, SAEGW-C 360 that includes SGW-C 362 and PGW-C 364, SAEGW-U1 370-1 that includes SGW-U 372-1 and PGW-U 374-1, and SAEGW-U2 370-2 that includes SGW-U 372-2 and PGW-374-2.

The v-PLMN 320 includes eNB 326(1) and eNB 326(2), MME 324, SGW 322 and DNS server 327.

Figure 7:
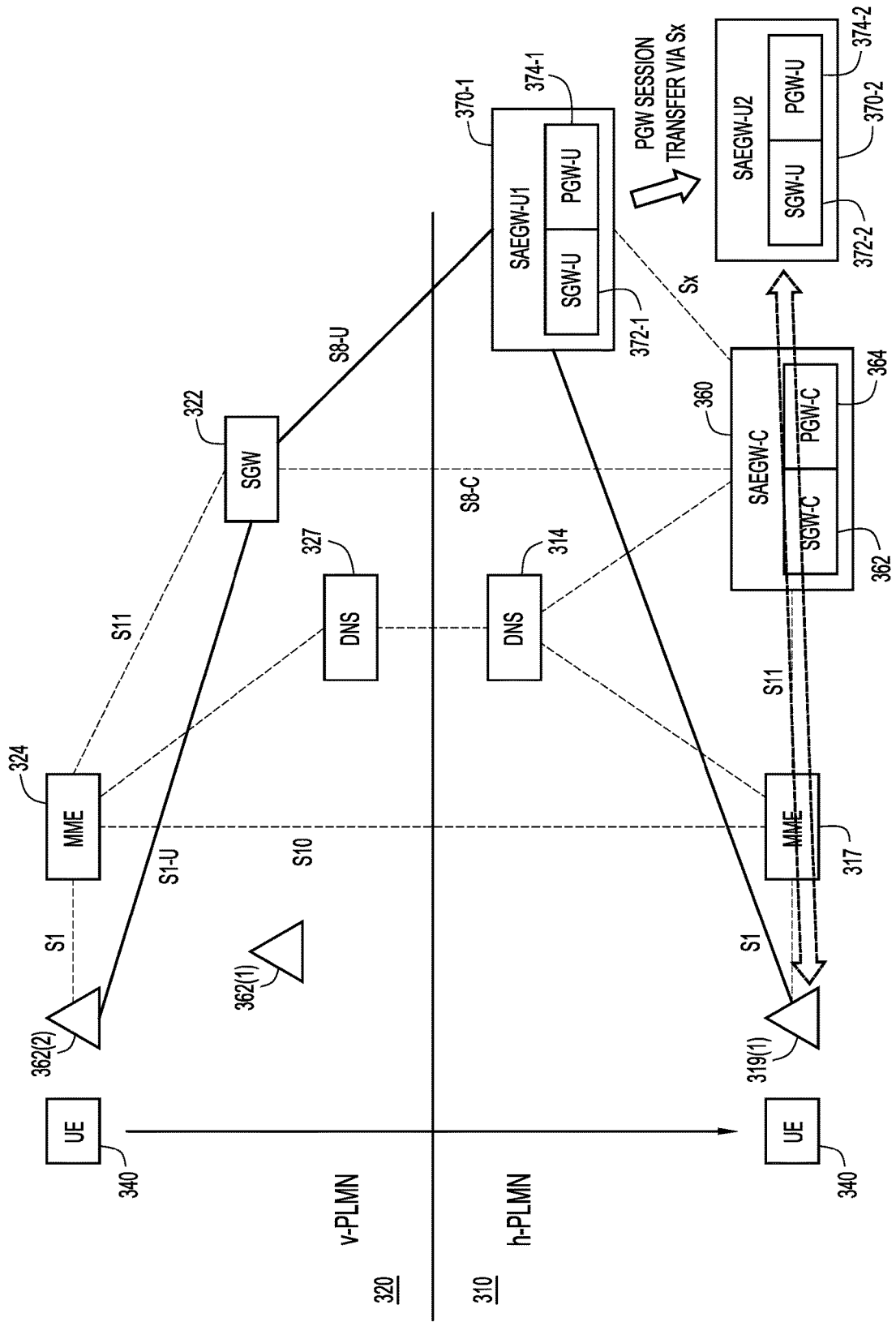
FIG. 7 is a diagram showing a scenario in which a mobile user devices roams and then subsequently returns to a home network but is served by a different geographical area/location and by which user plane traffic is switched to new user plane functions, according to an example embodiment.

In this scenario, when the UE 340 roams out of the h-PLMN 310 to the v-PLMN 320 and returns back to the h-PLMN 310 but is served by a different geographical area/location, there would be a need to switch the context/session to a much better/optimal user plane function. Session anchoring control plane functions on the h-PLMN 310 (which does not get changed) selects and switches the traffic via a new optimal user-plane function as shown in FIG. 7. User plane function node selection logic running on the SGW 322 determines the best/optimal user plane function node to handle the call upon return to home network after roaming to the v-PLMN 320 and it is worth disrupting the existing PDN session to re-home it to an optimal user plane function node (as selected by UPF node selection-logic) to provide better Quality of Experience/Quality of Service (QoE/QoS) for the mobile subscriber.

In the example shown in FIG. 7, the session had been anchored on the SAEGW-U1 370-1, but after the UE returns back to the h-PLMN, it is determined that it is worth disrupting the existing PDN session to re-home it to the SAEGW-U2 370-2. In other words, it is not worth keeping the call maintained by the user plane function that was used to support the call in the v-PLMN. When the UE 340 comes back to the h-PLMN, the optimum user plane node is selected, and in the example shown in FIG. 7, this is the SAEGW-U2 370-2.

Figure 8A:
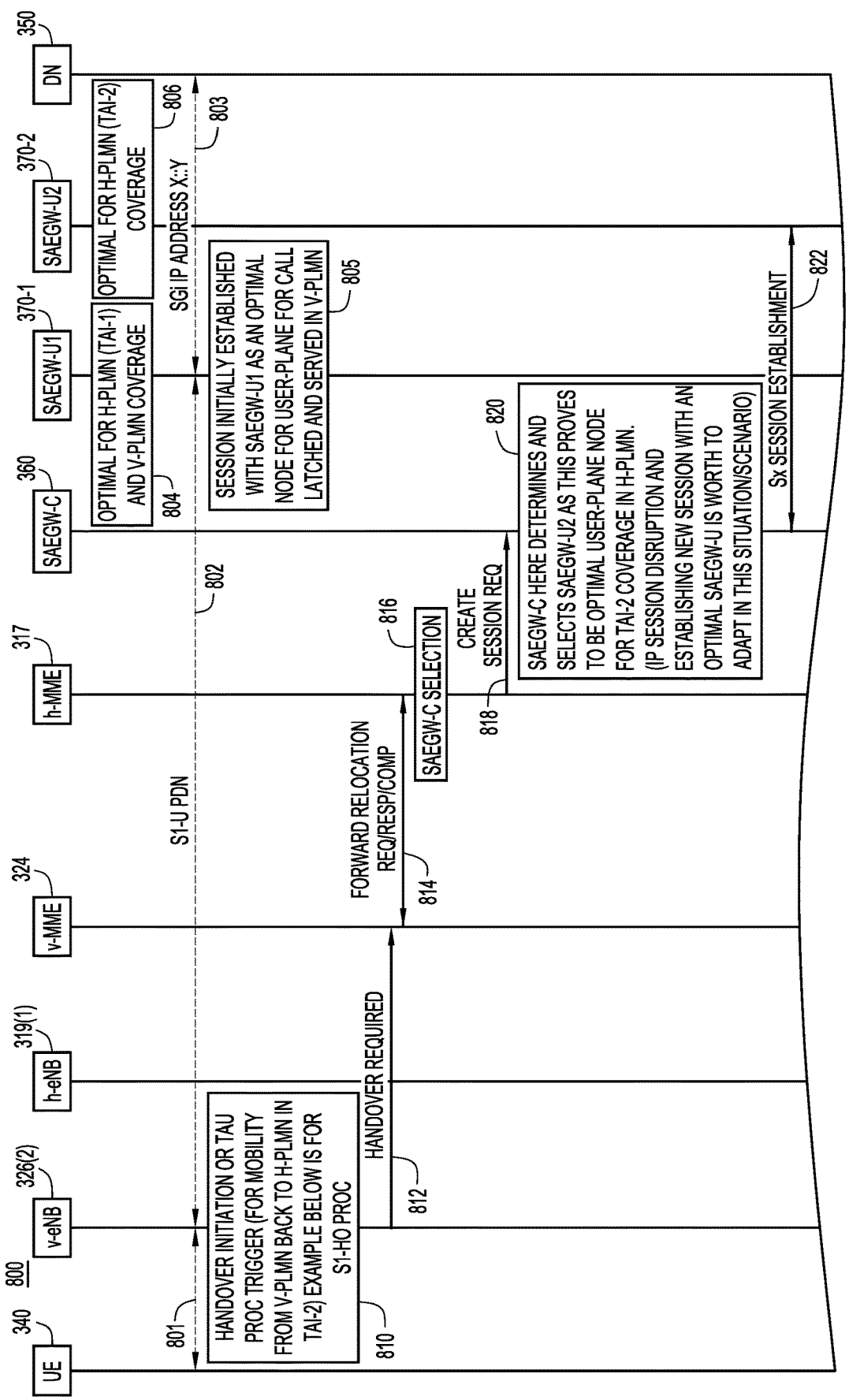
FIGS. 8A and 8B illustrate a sequence diagram for a process by which a user plane entity is selected for the scenario depicted in FIG. 7, according to an example embodiment.
Figure 8B:
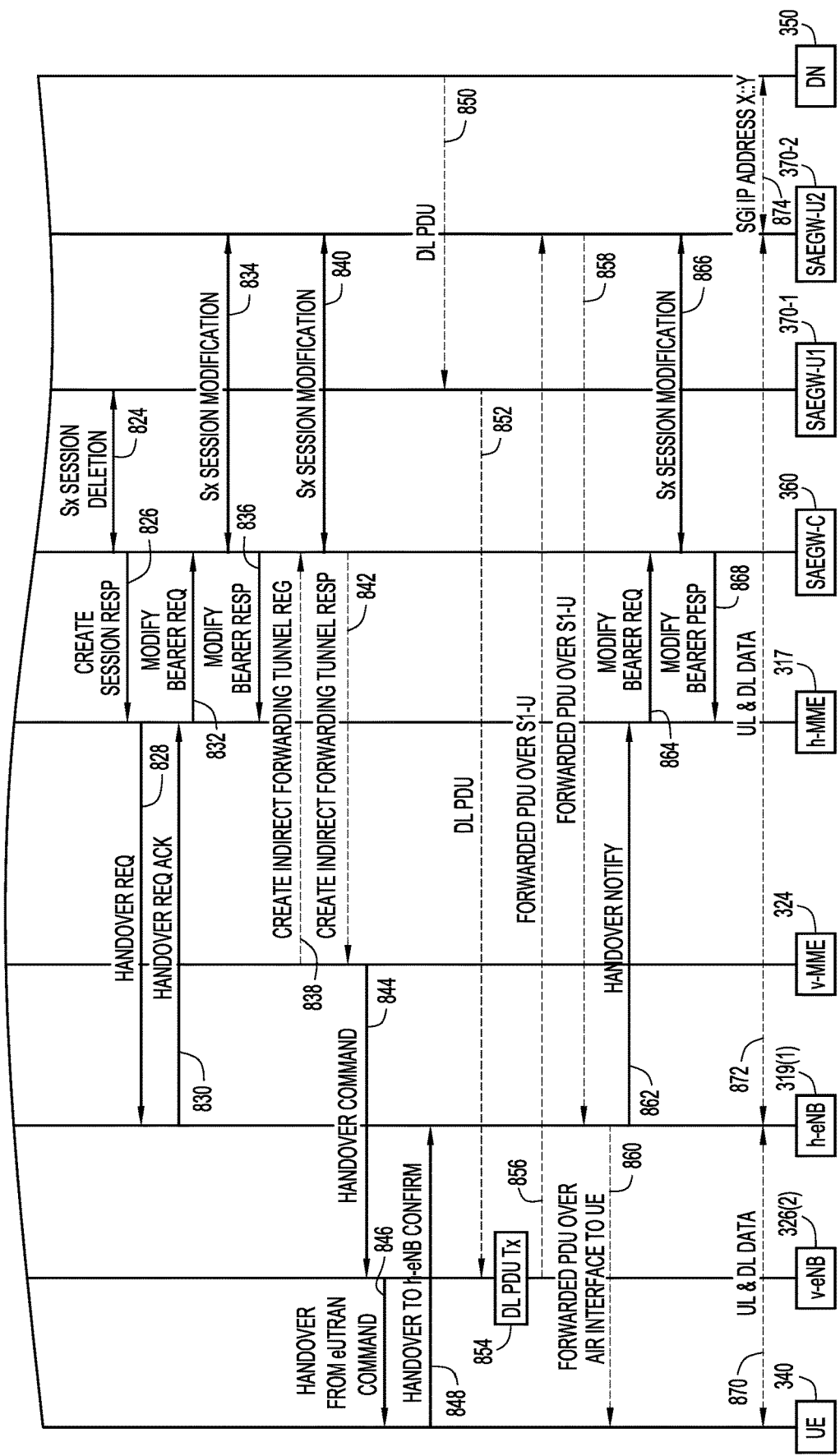

Reference is now made to FIGS. 8A and 8B, with continued reference to FIG. 7, for a description of a process 800 to select an optimal user plane function for the scenario depicted in FIG. 7. As shown at 801, the UE 340 is in wireless communication with the v-eNB 326(2), and at 802 an S1-U PDN session is maintained between the v-eNB 326(2) and the SAEGW-U1 370-1. The SAEGW-U1 370-1 also is in communication with the DN 350 via an SG1 interface with IP address "X::Y" as shown at 803.

As shown in FIG. 8A at 804, SAEGW-U1 370-1 is the optimal user plane node for TAI-1 coverage in the h-PLMN 310 and for v-PLMN coverage. As shown at 806, SAEGW-U2 370-2 is the optimal user plane node for TAI-2 coverage in the h-PLMN 310. Initially, the session is established with SAEGW-U1 370-1 because it is the optimal node for user-plane node for a call latched and served in the v-PLMN, as shown at 805.

At some point in time, due to movement of the UE 340 in the manner described above, handover is initiated or a Tracking Area Update (TAU) procedure is triggered, as shown at 810. For example, the UE moves from v-PLMN 320 back to the h-PLMN 310 in TAI-2. The example shown in FIGS. 8A and 8B is for an S1-HO procedure. At 812, the v-eNB 326(2) sends a handover required/request notification to the v-MME 324.

The v-MME 324 and h-MME 317 engage in a relocation request/response exchange at 814. At 816, the h-MME 317 selects an SAEGW-C. In this example, the h-MME 317 selects SAEGW-C 360. At 818, the h-MME 317 sends a create session request to the SAEGW-C 360. Up to this point, the S1-U PDN session had been maintained by the user plane node SAEGW-U1 370-1 for the UE 340 because the UE 340 had been in the v-PLMN 320.

At 820, the SAEGW-C 360 selects an optimal user plane node for the current location of the UE 340 for TAI-2 coverage in the h-PLMN 310. In this example, the optimal user plane node is SAEGW-U2 370-2 for TAI-2 coverage in the h-PLMN. SAEGW-U1 370-1 is no longer the optimal user plane node for the given location of the UE 340.

At 822, the SAEGW-C 360 sends an Sx session establishment notification to the SAEGW-U2 370-2. At 824, the SAEGW-U1 370-1 and the SAEGW-C 360 engage in an Sx session deletion exchange. At 826, the SAEGW-C 360 sends a create session response (responsive to the create session request 818) to the h-MME 317.

At 828, the h-MME 317 sends a handover request to the h-eNB 319(1) and at 830, the h-eNB 319(1) sends a handover request acknowledgment back to the h-MME 317.

Next, at 832, the h-MME 317 sends a modify bearer request to the SAEGW-C 360. The SAEGW-C 360 then engages in an Sx session modification with the SAEGW-U2 370-2, at 834. The SAEGW-C 360 sends a modify bearer response at 836 to the h-MME 317.

At 838, the v-MME 324 sends a request to create an indirect forwarding tunnel to the SAEGW-C 360. At 840, the SAEGW-C 360 engages in an Sx session modification with the SAEGW-U2 370-2. At 842, the SAEGW-C 360 sends a create indirect forwarding tunnel response to the v-MME 324.

The v-MME 324 then sends a handover command to the v-eNB 326(2) at 844 in the v-PLMN 310. The v-eNB 326(2) sends a handover from eUTRAN command to the UE 340 at 846. At 848, the UE sends a handover confirmation to the h-eNB 319(1). At this point, handover to h-eNB 319(1) in the h-PLMN 310 is completed.

FIG. 8B shows at 850 a DL PDU being sent from the DN 350 intended for the UE 340. The SAEGW-U1 370-1 receives the DL PDU and forwards it to the v-eNB 326(2) at 852. At 854 the v-eNB 326(2) notes that it has a DL PDU to transmit to the UE 340, but at 856, the v-eNB 326(2) forwards the PDU over the S1-U interface to the SAEGW-U2 370-2. At 858, the SAEGW-U2 370-2 forwards the PDU over the S1-U interface to the h-eNB 319(1), and at 860, the h-eNB 319(1) forwards the PDU over the air interface to the UE 340. At 862, the h-eNB 319(1) sends a handover notification to the h-MME 317.

The h-MME 317 sends a modify bearer request to the SAEGW-C 360 at 864. Then, SAEGW-C 360 engages in an Sx session modification with the SAEGW-U2 370-2, at 866. At 868, the SAEGW-C 360 sends a modify bearer response to the h-MME 317.

Now, the SAEGW-U2 370-2 is the user plane node that maintains the PDN session between the DN 350 and the UE 340 via h-eNB 319(1), as shown at reference numerals 870, 872 and 874.

In summary, according to one aspect as shown in FIGS. 5-8B, a process is provided to preserve a UE IP address by associating the UE (which moves into a new TAI or PLMN) to the same SAEGW (SGW-C and PGW-C) as the one that was associated before (in the previous TAI), but select optimal SGW-U and PGW-U nodes while tunneling all the user traffic over the newly established PDN session.

In accordance with another aspect, the processes of FIGS. 3-8B could be executed selectively per UE. To do so, logic may be provided to monitor active sessions (with the traffic) at the current PGW for that UE. For example, active Voice (Voice over LTE (VoLTE)) calls are monitored. If no active calls are detected, then the UE IP address is not preserved and the UE is homed to the optimal SAEGW per the new TAI using the SGW-C/U and PGW-C/U re-selection mechanism. This may involve the MME communicating with the current SAEGW to obtain the Yes/No outcome based on the monitoring of active sessions, in order to decide to which SAEGW the UE is homed during handover.

These procedures could be done together so that a UE could be homed to two simultaneous SAEGW's per APN/PDP session.

In summary, a process is provided for selecting an optimum user plane for a UE based on several criteria: V-PLMN SGW S8 IP topology, V-PLMN to H-PLMN radio access network (RAN) association and co-location of SGW-U and PGW-U. DNS responses, network topology and local policy are combined with per UE preference parameters.

Figure 9:
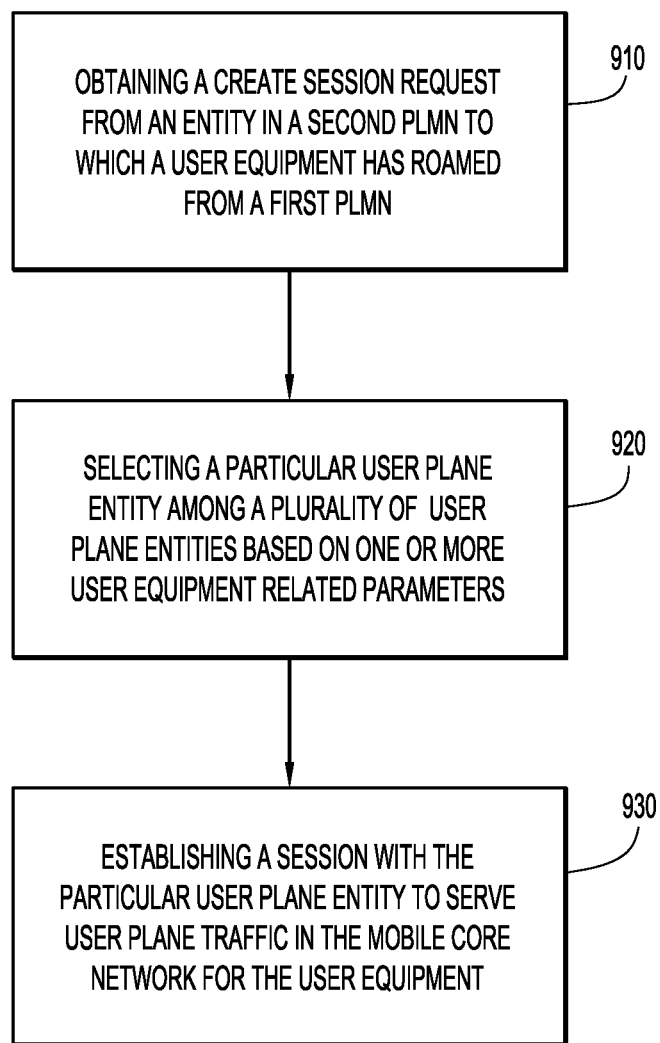
FIG. 9 is a flow chart of a method by which a control plane entity selects a user plane entity, according to an example embodiment.

Reference is now made to FIG. 9. FIG. 9 illustrates a flow chart for a method 900 performed by a control plane entity in a mobile core network that supports inter PLMN roaming among two or more PLMNs. At 910, the control plane entity obtains (receives) a create session request from an entity in a second PLMN to which a user equipment has roamed from a first PLMN. In one example, the control plane entity is the PGW-C 312 shown in FIGS. 3, 4A and 4B, and the entity that sends the create session request to the control plane entity may be an SGW in the second PLMN, such as v-SGW 322 in v-PLMN 310 as shown in FIGS. 3, 4A and 4B. In this example, the first PLMN is the UE's h-PLMN and the second PLMN is a v-PLMN.

In another example, the control plane entity is the PGW-C 364 shown in FIGS. 5, 6A and 6B, and the entity that sends the create session request to the control plane entity may be the h-MME 317 in the h-PLMN 310 (where the user equipment is roaming back to the h-PLMN from a v-PLMN). In this example, the first PLMN is a v-PLMN and the second PLMN is the user equipment's h-PLMN.

In still another example, the control plane entity is the SAEGW-C 360 shown in FIGS. 7, 8A and 8B, and the entity that sends the create session request to the control plane entity may be the h-MME 317 in the h-PLMN 310 (where the user equipment is roaming back to the h-PLMN from a v-PLMN). In this example, the first PLMN is a v-PLMN and the second PLMN is the user equipment's h-PLMN.

The create session request may be for an S8 interface session.

At 920, the control plane entity selects a particular user plane entity among a plurality of user plane entities based on one or more user equipment related parameters. In the example of FIGS. 3, 4A and 4B, the particular user plane entity is a PGW-U, such as PGW-U 318. In the example of FIGS. 5, 6A and 6B, the particular user plane entity is an SAEGW-U, such as SAEGW-U 370. In the example of FIGS. 7, 8A and 8B, the particular user plane entity is an SAEGW-U, such as SAEGW-U2 370-2.

At 930, the control plane entity establishes a session with the particular user plane entity to serve user plane traffic in the mobile core network for the user equipment.

FIG. 10 illustrates a hardware block diagram of a computing device 1000 that may serve perform the functions of any of the servers or computing or control entities referred to herein in connection with FIGS. 1-9. It should be appreciated that FIG. 10 provides only an illustration of one embodiment and does not imply any limitations with regard to the environments in which different embodiments may be implemented. Many modifications to the depicted environment may be made.

As depicted, the device 1000 includes a bus 1012, which provides communications between computer processor(s) 1014, memory 1016, persistent storage 1018, communications unit 1020, and input/output (I/O) interface(s) 1022. Bus 1012 can be implemented with any architecture designed for passing data and/or control information between processors (such as microprocessors, communications and network processors, etc.), system memory, peripheral devices, and any other hardware components within a system. For example, bus 1012 can be implemented with one or more buses.

Memory 1016 and persistent storage 1018 are computer readable storage media. In the depicted embodiment, memory 1016 includes random access memory (RAM) 1024 and cache memory 1026. In general, memory 1016 can include any suitable volatile or non-volatile computer readable storage media.

One or more programs may be stored in persistent storage 1018 for execution by one or more of the respective computer processors 1014 via one or more memories of memory 1016. The persistent storage 1018 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions for control plane logic 1017 that, when executed by the one or more processors 1014, cause the computing device 1000 to perform the operations a control plane entity or a network device described herein in connection with the accompanying figures.

The media used by persistent storage 1018 may also be removable. For example, a removable hard drive may be used for persistent storage 1018. Other examples include optical and magnetic disks, thumb drives, and smart cards that are inserted into a drive for transfer onto another computer readable storage medium that is also part of persistent storage 1018.

Communications unit 1020, in these examples, provides for communications with other data processing systems or devices. In these examples, communications unit 1020 includes one or more network interface cards. Communications unit 1020 may provide communications through the use of either or both physical and wireless communications links.

I/O interface(s) 1022 allows for input and output of data with other devices that may be connected to computer device 1000. For example, I/O interface 1022 may provide a connection to external devices 1028 such as a keyboard, keypad, a touch screen, and/or some other suitable input device. External devices 1028 can also include portable computer readable storage media such as database systems, thumb drives, portable optical or magnetic disks, and memory cards.

Software and data used to practice embodiments can be stored on such portable computer readable storage media and can be loaded onto persistent storage 1018 via I/O interface(s) 1022. I/O interface(s) 1022 may also connect to a display 1030. Display 1030 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided that is performed at a control plane entity in a mobile core network that supports inter public land mobile network (PLMN) roaming among two or more PLMNs. The method includes: obtaining a create session request from an entity in a second PLMN to which a user equipment has roamed from a first PLMN; selecting a particular user plane entity among a plurality of user plane entities based on one or more user equipment related parameters; and establishing a session with the particular user plane entity to serve user plane traffic in the mobile core network for the user equipment.

The particular user plane entity may be a packet data network gateway that is part of a System Architecture Evolution Gateway user plane (SAEGW-U) entity.

In one embodiment, the selecting includes: providing a Domain Name System (DNS) query to a DNS server; obtaining a DNS response from the DNS server; and applying selection criteria to the DNS response to select the particular user plane entity. The DNS response may include a list of the plurality of user plane entities, and the applying selection criteria includes: sorting the list of the plurality of user plane entities according to geographical proximity to the first PLMN and the second PLMN and/or predictive analysis based on history of frequent hopping of the user equipment between the first PLMN and the second PLMN, to produce a sorted list of the plurality of user plane entities; and selecting a highest priority user plane entity, in the sorted list of the plurality of user plane entities, that satisfies roaming and mobile edge computing policies. The sorting operation may be based cell global identifier, tracking area identifier and access point name.

The selecting may include selecting the particular user plane entity which is located at a boundary of the first PLMN and the second PLMN when the first PLMN and the second PLMN are very near to each other or overlapping.

In another form, the selecting operation may include performing predictive and geographical topology analysis on switchover behavior of the user equipment between the first PLMN and the second PLMN to select the particular user plane entity that is suitable for when the user equipment is located in the first PLMN or the second PLMN.

The method may further include tunneling the user plane traffic for the user equipment over the session established with the particular user plane entity to forward downlink user plane traffic intended for the user equipment from the particular user plane entity to a base station in the second PLMN for wireless transmission to the user equipment.

As described above in connection with the figures, the first PLMN may be a home PLMN for the user equipment and the second PLMN is a visiting PLMN. On the other hand, the first PLMN may be a visiting PLMN and the second PLMN is a home PLMN for the user equipment.

In one example, the first PLMN is a visiting PLMN and the second PLMN is a home PLMN for the user equipment, and the plurality of user plane entities includes at least a first user plane entity that is optimal for use when the user equipment is in a first tracking area of the second PLMN and when the user equipment is in the first PLMN, and a second user plane entity that is optimal for use when the user equipment is in a second tracking area of the second PLMN, and wherein the first user plane entity serves user plane traffic for the user equipment prior to the user equipment roaming from the first PLMN to the second PLMN, wherein selecting comprises selecting as the particular user plane entity the second user plane entity when the user equipment roams into the second tracking area of the second PLMN. In this scenario, the method may further include tunneling the user plane traffic for the user equipment over the session established with the second user plane entity to forward downlink user plane traffic intended for the user equipment from the second user plane entity to a base station in the second PLMN for wireless transmission to the user equipment. The control plane entity may maintain control plane association to the user equipment before and after the user equipment roams from the first tracking area to the second tracking area.

In another form, an apparatus is provided comprising: a communication interface configured to enable communication with entities in a mobile core network that supports inter public land mobile network (PLMN) roaming among two or more PLMNs; and a processor coupled to the communication interface, wherein the processor is configured to perform operations including: obtaining a create session request from an entity in a second PLMN to which a user equipment has roamed from a first PLMN; selecting a particular user plane entity among a plurality of user plane entities based on one or more user equipment related parameters; and establishing a session with the particular user plane entity to serve user plane traffic in the mobile core network for the user equipment.

In still another form, one or more non-transitory computer readable storage media are provided that store instructions, that when executed by a processor of a control plane entity in a mobile core network that supports inter public land mobile network (PLMN) roaming among two or more PLMNs, cause the processor to perform operations including: obtaining a create session request from an entity in a second PLMN to which a user equipment has roamed from a first PLMN; selecting a particular user plane entity among a plurality of user plane entities based on one or more user equipment related parameters; and establishing a session with the particular user plane entity to serve user plane traffic in the mobile core network for the user equipment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a control plane node in a mobile core network that supports inter public land mobile network (PLMN) roaming among two or more PLMNs:
obtaining a create session request from a node in a second PLMN to which a user equipment has roamed from a first PLMN;
selecting a particular user plane node from a list of a plurality of user plane nodes based on roaming and mobile edge computing policies, wherein the particular user plane node is a highest priority user plane node, in the list of the plurality of user plane nodes, that satisfies the roaming and mobile edge computing policies; and
establishing a session with the particular user plane node to serve user plane traffic in the mobile core network for the user equipment.

2. The method of claim 1, wherein priority of the plurality of user plane nodes is based on geographic proximity to the first PLMN and the second PLMN.

3. The method of claim 1, wherein priority of the plurality of user plane nodes is based on a history of switchover behavior of the user equipment between the first PLMN and the second PLMN.

4. The method of claim 1, wherein selecting includes selecting the particular user plane node which is located at a boundary of the first PLMN and the second PLMN when the first PLMN and the second PLMN are very near to each other or overlapping.

5. The method of claim 1, wherein the particular user plane node is packet data network gateway that is part of a System Architecture Evolution Gateway user plane (SAEGW-U) node.

6. The method of claim 1, further comprising:
tunneling the user plane traffic for the user equipment over the session established with the particular user plane node to forward downlink user plane traffic intended for the user equipment from the particular user plane node to a base station in the second PLMN for wireless transmission to the user equipment.

7. The method of claim 1, wherein the first PLMN is a visiting PLMN and the second PLMN is a home PLMN for the user equipment,
wherein the plurality of user plane nodes includes at least a first user plane node for use when the user equipment is in a first tracking area of the second PLMN and when the user equipment is in the first PLMN, and a second user plane node for use when the user equipment is in a second tracking area of the second PLMN,
wherein the first user plane node serves user plane traffic for the user equipment prior to the user equipment roaming from the first PLMN to the second PLMN, and
wherein selecting comprises selecting, as the particular user plane node, the second user plane node when the user equipment roams into the second tracking area of the second PLMN.

8. An apparatus comprising:
a communication interface configured to enable communication with entities in a mobile core network that supports inter public land mobile network (PLMN) roaming among two or more PLMNs; and
a processor coupled to the communication interface, wherein the processor is configured to perform operations including:
obtaining a create session request from a node in a second PLMN to which a user equipment has roamed from a first PLMN;
selecting a particular user plane node from a list of a plurality of user plane nodes based on roaming and mobile edge computing policies, wherein the particular user plane node is a highest priority user plane node, in the list of the plurality of user plane nodes, that satisfies the roaming and mobile edge computing policies; and
establishing a session with the particular user plane node to serve user plane traffic in the mobile core network for the user equipment.

9. The apparatus of claim 8, wherein priority of the plurality of user plane nodes is based on geographic proximity to the first PLMN and the second PLMN.

10. The apparatus of claim 8, wherein priority of the plurality of user plane nodes is based on a history of switchover behavior of the user equipment between the first PLMN and the second PLMN.

11. The apparatus of claim 8, wherein the processor is configured to select by selecting the particular user plane node which is located at a boundary of the first PLMN and the second PLMN when the first PLMN and the second PLMN are very near to each other or overlapping.

12. The apparatus of claim 8, wherein the particular user plane node is packet data network gateway that is part of a System Architecture Evolution Gateway user plane (SAEGW-U) node.

13. The apparatus of claim 8, wherein the processor is further configured to:
tunnel the user plane traffic for the user equipment over the session established with the particular user plane node to forward downlink user plane traffic intended for the user equipment from the particular user plane node to a base station in the second PLMN for wireless transmission to the user equipment.

14. The apparatus of claim 8, wherein the first PLMN is a visiting PLMN and the second PLMN is a home PLMN for the user equipment,
wherein the plurality of user plane nodes includes at least a first user plane node for use when the user equipment is in a first tracking area of the second PLMN and when the user equipment is in the first PLMN, and a second user plane node for use when the user equipment is in a second tracking area of the second PLMN,
wherein the first user plane node serves user plane traffic for the user equipment prior to the user equipment roaming from the first PLMN to the second PLMN, and
wherein the processor is configured to select by selecting, as the particular user plane node, the second user plane node when the user equipment roams into the second tracking area of the second PLMN.

15. One or more non-transitory computer readable storage media storing instructions, that when executed by a processor of a control plane entity in a mobile core network that supports inter public land mobile network (PLMN) roaming among two or more PLMNs, cause the processor to perform operations including:
obtaining a create session request from a node in a second PLMN to which a user equipment has roamed from a first PLMN;
selecting a particular user plane node from a list of a plurality of user plane nodes based on roaming and mobile edge computing policies, wherein the particular user plane node is a highest priority user plane node, in the list of the plurality of user plane nodes, that satisfies the roaming and mobile edge computing policies; and
establishing a session with the particular user plane node to serve user plane traffic in the mobile core network for the user equipment.

16. The non-transitory computer readable storage media of claim 15, wherein priority of the plurality of user plane nodes is based on geographic proximity to the first PLMN and the second PLMN.

17. The non-transitory computer readable storage media of claim 15, wherein priority of the plurality of user plane nodes is based on a history of switchover behavior of the user equipment between the first PLMN and the second PLMN.

18. The non-transitory computer readable storage media of claim 15, wherein the instructions cause the processor to perform selecting by selecting the particular user plane node which is located at a boundary of the first PLMN and the second PLMN when the first PLMN and the second PLMN are very near to each other or overlapping.

19. The non-transitory computer readable storage media of claim 15, wherein the particular user plane node is packet data network gateway that is part of a System Architecture Evolution Gateway user plane (SAEGW-U) node.

20. The non-transitory computer readable storage media of claim 15, wherein the instructions further cause the processor to perform an additional operation comprising:
tunneling the user plane traffic for the user equipment over the session established with the particular user plane node to forward downlink user plane traffic intended for the user equipment from the particular user plane node to a base station in the second PLMN for wireless transmission to the user equipment.

* * * * *